though Patent Office
3,511,038
Patented May 12, 1970

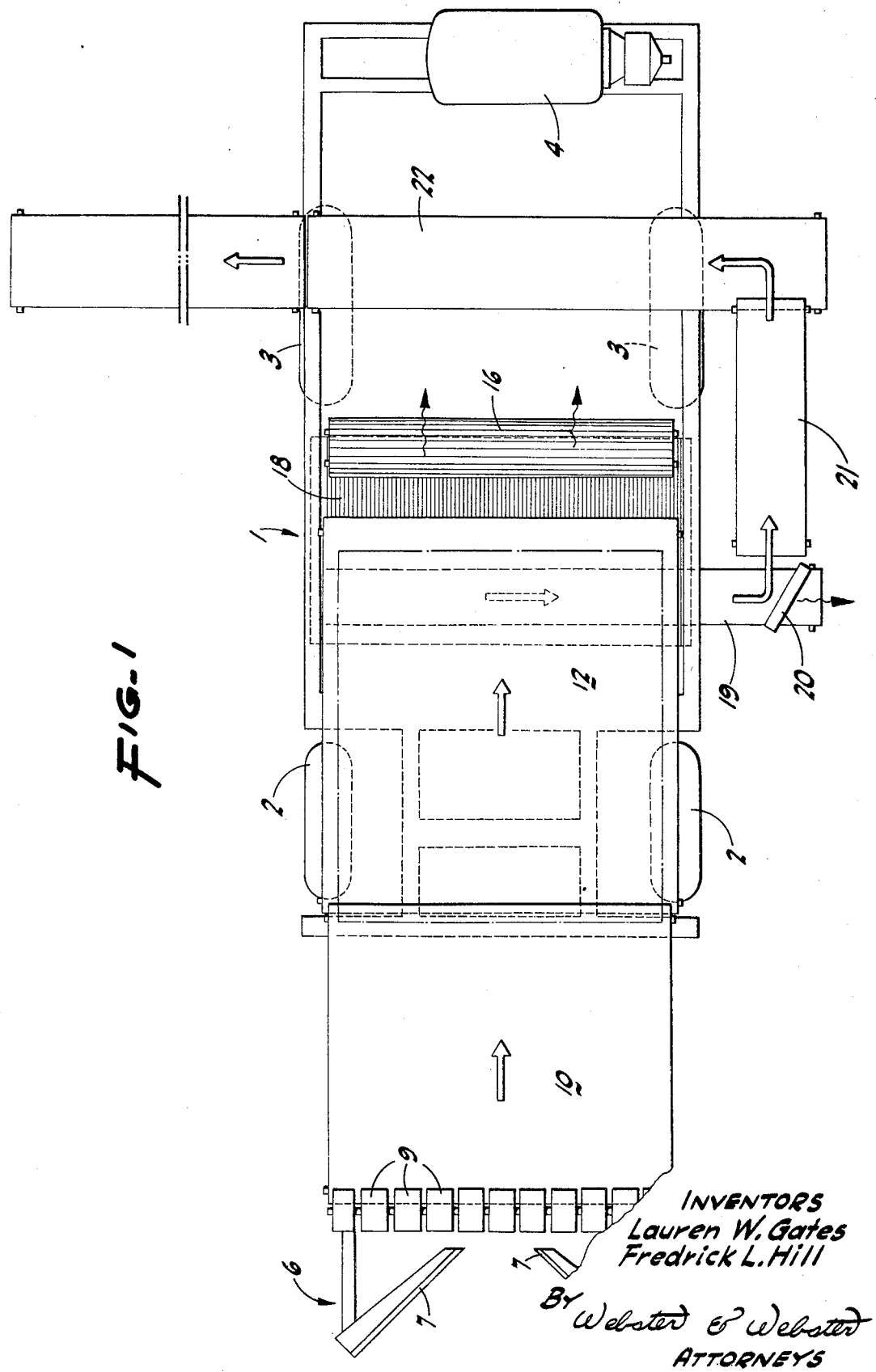

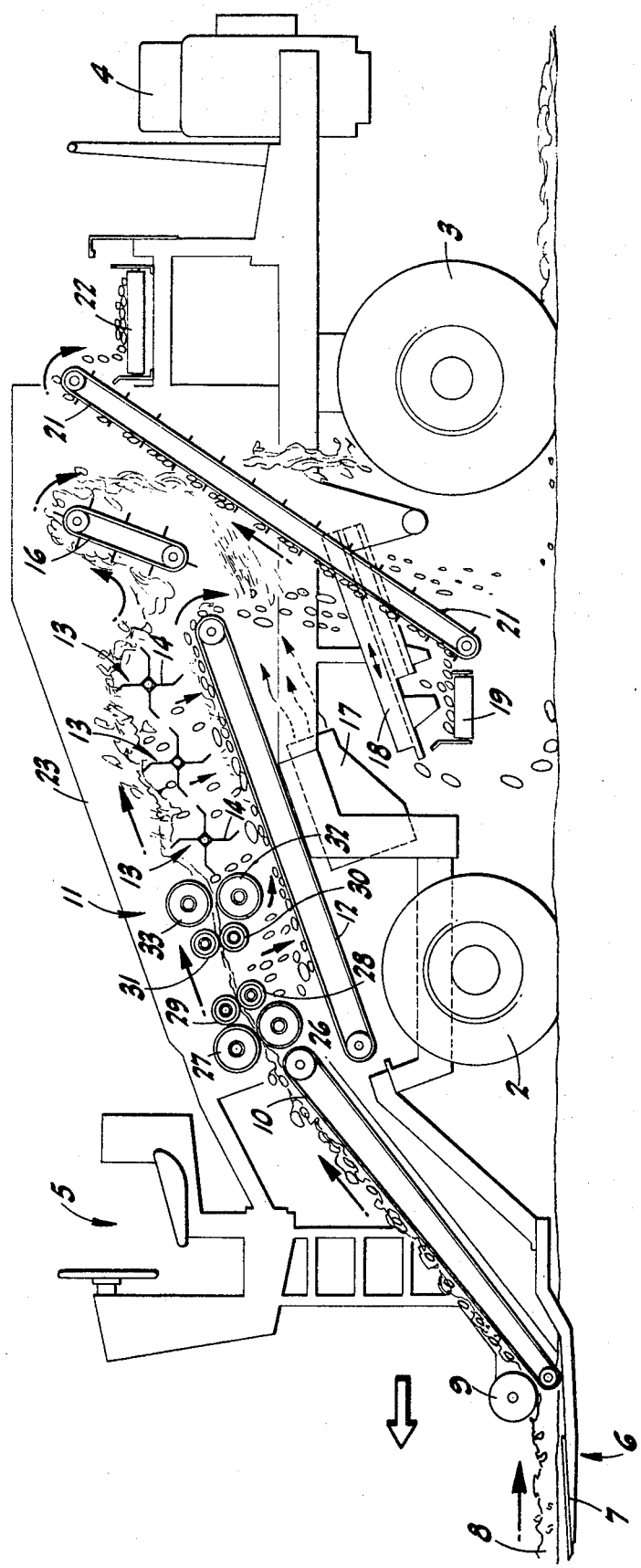

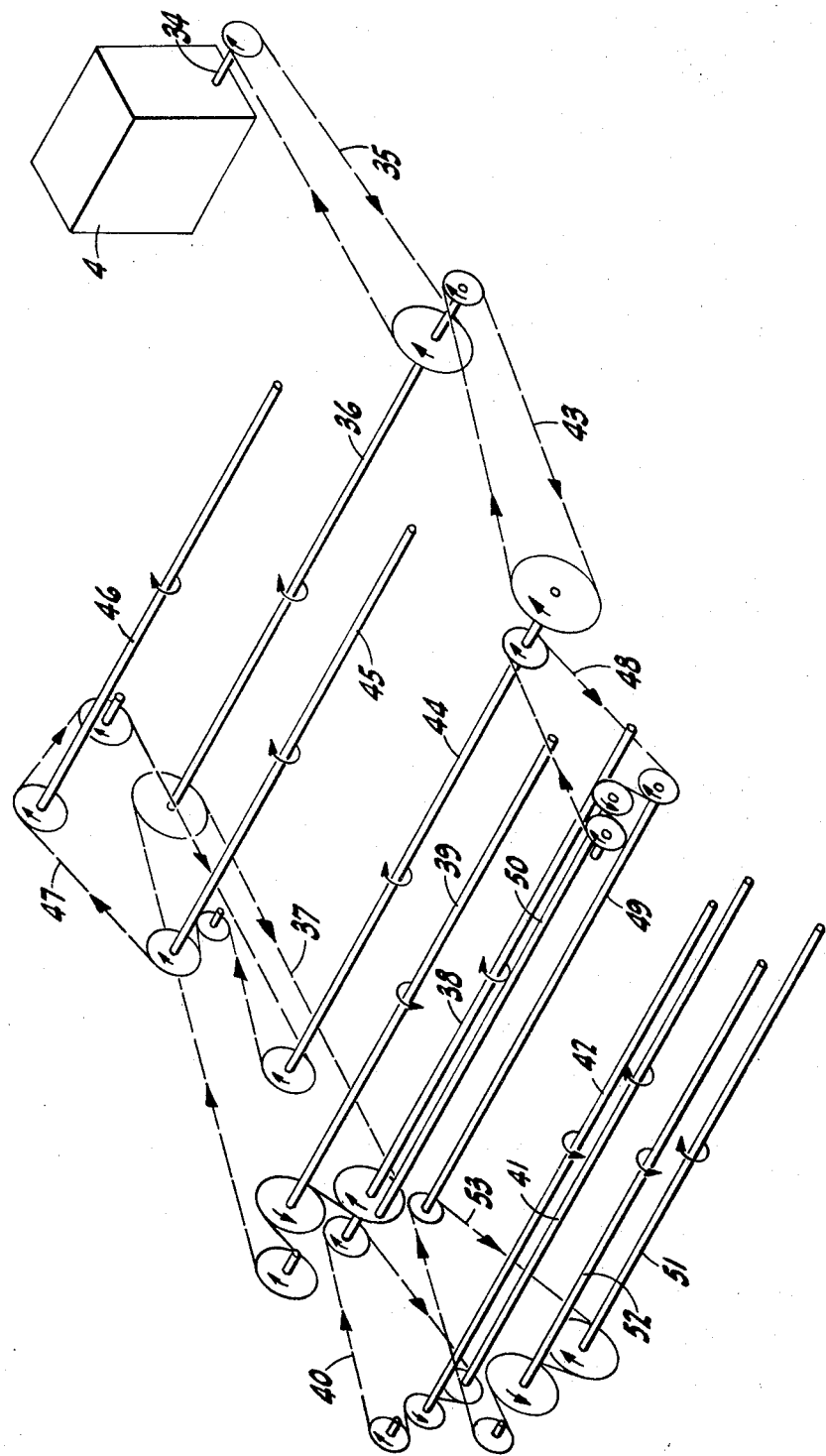

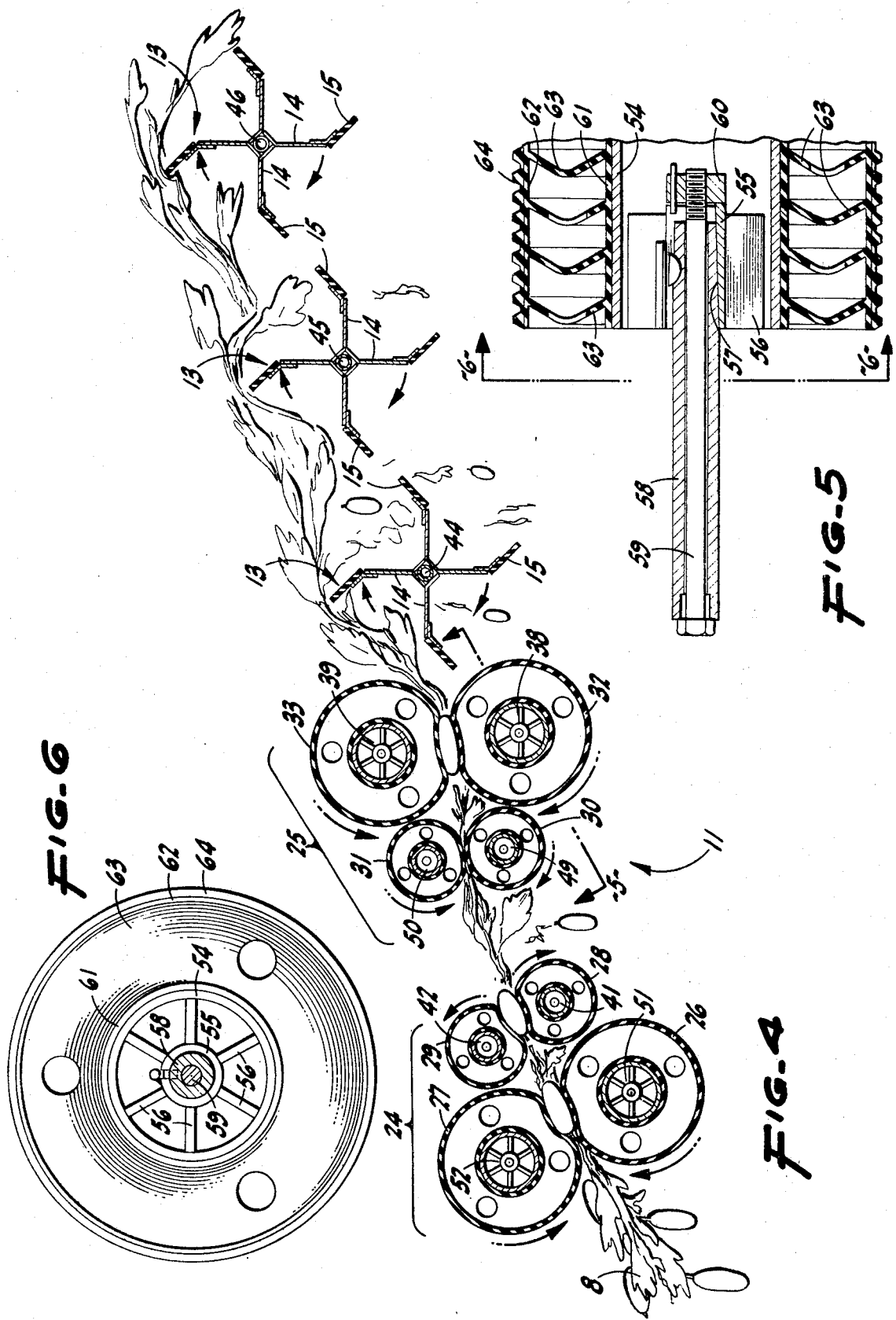

3,511,038
CUCUMBER HARVESTER
Lauren W. Gates and Fredrick L. Hill, Rio Vista, Calif., assignors to Blackwelder Manufacturing Company, Rio Vista, Calif., a corporation of California
Filed Sept. 5, 1967, Ser. No. 665,508
Int. Cl. A01d 45/00, 27/00
U.S. Cl. 56—327                          9 Claims

ABSTRACT OF THE DISCLOSURE

A self-propelled mechanical harvester for vine-grown row crops, especially cucumbers harvested in bulk for processing as pickles; the harvester including, as an essential component, a power driven roll assembly—through which the vines feed—operative to detach the cucumbers from such vines.

BACKGROUND OF THE INVENTION

For many years it has been the custom to harvest cucumbers by hand; this having been a tedious labor-consuming task. Efforts to harvest cucumbers mechanically have been undertaken but without entire success as problems have been met in attaining the requisite high percentage of recovery of unbruised, useable-size cucumbers from the vines as cut from the ground and then fed in their entirety through the harvester. The present invention was conceived in working to the solution of such problems.

SUMMARY OF THE INVENTION

The present invention provides, as a major object, a self-propelled, "once-over" cucumber harvester which embodies—on a wheeled supporting frame—a cutter unit which severs the vines from the ground, an endless elevator conveyor which carries the cut vines upward and rearward, a picking unit through which the vines continuously feed from the elevator conveyor, the picking unit detaching the cucumbers from the vines, means separately accumulating and conveying the cucumbers as detached from the vines, a grader through which the detached cucumbers feed, and a carry-off conveyor system—including a sorting belt—for the retained cucumbers.

The present invention provides, as another and important object, a cucumber harvester wherein the picking unit comprises a novel cushion roll assembly through which the cut vines continuously feed; such assembly being arranged so that certain peripherally cooperating cushion rolls (hereinafter identified as holding rolls) grip the cut cucumber-bearing vines passing therebetween and limit their advancing motion to a given speed, while therebeyond such vines pass between other peripherally cooperating cushion rolls (hereinafter identified as picking rolls) which are set to grip the cucumbers more forcefully than the vines and accelerate the speed of such cucumbers relative to the limited speed of the vines passing between the holding rolls. As a consequence of this differential in speed between the vines and the cucumbers, there results a fast and effective detachment or "plucking" of the latter from such vines.

The present invention provides, as still another object, a cushion roll assembly, as in the preceding paragraph, wherein the yieldability and resiliency of the cooperating cushion rolls (both the holding rolls and picking rolls) is such that the cucumbers passing therebetween are not—even though frictionally engaged—crushed, marred, or otherwise damaged; this for the reason that the rolls yield and accommodate the passing cucumbers.

The present invention provides, as a further object, a cucumber harvester which is designed for ease and economy of manufacture, and convenience of use.

The present invention provides, as a still further object, a practical and reliable cucumber harvester and one which is exceedingly effective for the purpose for which it is designed.

BRIEF DESCRIPTION OF THE DRAWINGS

FIG. 1 is a diagrammatic plan view of the cucumber harvester; the view showing mainly the path of travel of the vines, and cucumbers when detached, through the machine.

FIG. 2 is a longitudinal elevation, again somewhat diagrammatic, with the working components exposed for the purpose of illustration.

FIG. 3 is a diagram showing the driving arrangement for the cushion roll assembly of the picking unit, and the vine shaking and conveying rotors therebeyond.

FIG. 4 is an enlarged, fragmentary side elevation of said cushion roll assembly, and the vine shaking and conveying rotors, as in operation.

FIG. 5 is an enlarged, fragmentary longitudinal sectional elevation of an end portion of one of the cushion rolls; the view showing the construction of such roll, and the related end spindle as mounted in place.

FIG. 6 is a cross-section taken on line 6—6 of FIG. 5.

DESCRIPTION OF THE PREFERRED EMBODIMENT

Referring now more particularly to the accompanying drawings and to the characters of reference marked thereon, the cucumber harvester comprises a self-propelled, mobile frame 1 supported by front and rear ground-engaging wheels 2 and 3, respectively; the driving engine 4 being mounted on the rear of such frame, while the operator's station 5 is at the front thereof in an elevated position.

The frame 1 provides the support for the following working components of the harvester:

At ground level, below the operator's station 5 and somewhat of the front wheels 2, there is a cutter unit 6 which includes rearwardly converging cutter blades 7 which—as the harvester advances—run beneath the vines 8 and cut the same from their roots. The vines, as so cut, pass—in hold-down relation—beneath a transverse row of soft, vine-assist rollers 9 which are suitably driven and turn rearwardly at the bottom at a speed somewhat in excess of the ground speed of the harvester.

As they pass beneath the rollers 9, the vines 8 are received on an endless elevator conveyor 10 and carried upward and rearward to a discharge point generally above the front wheels 2; the forward and lower end of elevator conveyor 10 being directly below the vine-assist rollers 9.

From the upper and discharge end of the elevator conveyor 10, the vines pass through a picking unit, indicated generally at 11, which includes a novel cushion roll assembly operative to detach the cucumbers from the vines; such picking unit, and its functional characteristics, being hereinafter described in detail.

The cucumbers, as detached from the vines by the picking unit 11, gravitate therefrom and are received on an endless, longitudinally extending, collecting conveyor 12 which extends at a slight upward and rearward incline from its forward and lower end; the latter being disposed, in adjacent but spaced relation, substantially directly below the upper and discharge end of the elevator conveyor 10. Such cucumber collecting conveyor 12 is elongated and extends rearwardly—from its forward and lower end—not only beneath the entire picking unit 11 but also a substantial distance rearwardly thereof.

A bank of driven, transverse axis, vine conveying and shaking rotors, each indicated generally at 13, is mounted to the rear of, and in vine-receiving relatiton to, the picking unit 11. Each such rotor 13 is of spider construction and includes longitudinal, circumferentially spaced, radial vanes 14 fitted along their outer edges with relatively stiff, angularly disposed, rubber paddles 15.

The rotors 13, which are mounted in close proximity to each other, are driven to turn rearwardly at the top so that the vines—as received on the bank of such rotors from the picking unit 11—are conveyed rearwardly and discharged onto a short, endless, upwardly and rearwardly inclined carry-off conveyor 16 from the upper end of which the vines discharge and drop onto the ground centrally beneath the rear portion of the harvester.

As the vines are conveyed rearwardly on the bank of rotors 13, such vines are—by reason of the form of such rotors—jounced or shaken; this action causing any detached cucumbers, which may have remained in the entangled vines, to fall free thereof and onto the rear portion of the collecting conveyor 12.

The cucumber collecting conveyor 12 is driven so that the upper run thereof travels rearwardly and to the end that the cucumbers are discharged from the rear and upper end of said conveyor and thence fall free through an air blast created by a rearwardly discharging blower 17; such air blast—which is in a plane below but substantially parallel to the conveyor 12—being of a velocity sufficient to separate leaves and trash from the falling cucumbers but without causing the latter to materially deviate from their downward gravitational path.

After passing through such air blast, the cucumbers are received on a double-deck, shaker-grate-type classifier or grader 18; the too-large cucumbers remaining on and discharging from one end of the upper deck, while the too-small cucumbers pass through both the upper and the lower decks. The proper size cucumbers remain on and discharge from one end of the lower deck of the grader.

Upon being discharged from the grader 18, the proper size cucumbers fall onto an endless, cross conveyor 19 driven so that its upper run travels toward the left side of the harvester and beyond which side said cross conveyor projects some distance. Cucumbers on the cross conveyor 19 are swept from the outer end portion thereof—by a diagonally disposed, direction-changing rotary brush 20—onto the lower end of an endless, elevator conveyor 21; the brush 20 clearing the upper run of the cross conveyor sufficient to permit dirt (but not cucumbers) to pass under such brush for discharge onto the ground.

The elevator conveyor 21—which occupies an inclined position laterally out from the left side of the harvester—moves the cucumbers sharply upwardly and then discharges them onto the left-hand end portion of an endless, transverse sorting belt 22 which spans the harvester and projects beyond both sides thereof. The sorting belt 22 moves from left to right, and cucumbers thereon are hand sorted (for removal of defective cucumbers, etc.) before reaching and delivering from the right-hand or discharge end of said belt; the workers standing alongside the latter. From the belt, the harvested cucumbers are received in a bin (not shown) on a truck moving forward alongside the harvester.

Referring in detail to the picking unit 11, it comprises—as best shown in FIG. 4—a novel cushion roll assembly which is constructed and functions as follows:

Such cushion roll assembly—which extends substantially full width of the harvester between the sides 23 thereof—embodies a forward set of rolls indicated generally at 24, and a rearward set of rolls indicated generally at 25. Each of the rolls of both sets thereof are of cushion form (later described in detail) and hence are readily inwardly yieldable, although quite resilient, throughout the entire outer surface thereof; said surface preferably being rough to provide a more effective frictional gripping action.

The forward set 24 is comprised of a lower holding roll 26 and an upper holding roll 27 mounted in closely adjacent cooperative relation; these holding rolls being driven to turn rearwardly at their adjacent peripheral points.

The rearward set 25—which is disposed directly back of the forward set 24—comprises a lower picking roll 28 and an upper picking roll 29; these picking rolls also being driven to turn rearwardly at their adjacent peripheral points.

As the vines 8 feed, all intermingled and in a substantially continuous progression, from the upper end of the elevator conveyor 10 to the picking unit 11, such vines first pass between the holding rolls 26–27 which are set to grip and feed the vines at constant speed, in a manner to prevent later acceleration thereof, and without detaching the cucumbers; the rolls 26–27 yielding to accommodate the cucumbers with an absence of crushing or other damage thereto. In order to prevent piling or jamming of the vines on the elevator conveyor 10, the holding rolls 26–27 are driven slightly faster and so as to always accept the full vine discharge from said elevator conveyor.

As they continuously progress from the holding rolls 26–27, but with trailing portions remaining engaged thereby, the vines—with attached cucumbers—immediately enter between the picking rolls 28–29. Such picking rolls 28–29 are driven substantially faster than the holding rolls 26–27, and are spaced apart at their adjacent peripheral points a distance so as to grip and impart positive and accelerated rearward motion to the cucumbers, while the vines are fed in slippage relation from said picking rolls, and without acceleration—this due to the vine speed limiting effect of said holding rolls.

Thus, upon the cucumbers being accelerated in their speed while the vines are held against acceleration and their speed consequently remains substantially constant, the picking rolls 28–29 pull or pluck the cucumbers from the vines in a quick and efficient manner. As the cucumbers pass between and are gripped by the picking rolls 28–29, the later yield and accommodate such cucumbers without crushing or other damage.

From the forward set 24, the vines travel the short distance to and are received by the rearward set of rolls 25; such rearward set 25—just as the forward set 24—also comprising a lower holding roll 30, a cooperating upper holding roll 31, a lower picking roll 32, and a cooperating upper picking roll 33. Such rearward set 25 functions in the same manner as the forward set 24 and is provided for the purpose of detaching any cucumbers which may have remained on the vines after passing through said forward set 24. More particularly, the holding rolls 30–31 grip the vines and feed the same at a constant speed, while the picking rolls 32–33 grip the cucumbers and accelerate the same to a greater speed than that of the vines upon which a "hold-back" or speed limiting effect is imposed by said holding rolls. As before, this produces a most effective picking action.

The picking rolls 28–29 and the holding rolls 30–31 are of reduced diameter so that they can be mounted in close association with, and reduce the gap between, the holding rolls 26–27 and the picking rolls 32–33, respectively.

As indicated, all of the cushion rolls of the picking unit 11 are driven to turn rearwardly at the point of vine engagement, while each of the vine conveying and shaking rotors 13 is driven to turn rearwardly at the top; this preferably being accomplished by a drive system, shown diagrammatically in FIG. 3, comprised of the following:

From the shaft 34 of the engine 4 (mounted on the rear of the harvester) an endless drive 35 operates a countershaft 36 which in turn and through an endless drive 37 actuates the shafts 38–39 of the picking rolls 32–33. An endless drive 40 operates the shafts 41–42 of the picking rolls 28–29; such drive 40 being taken from shaft 38.

The countershaft 36 also actuates an endless drive 43 which rotates the shaft 44 of foremost rotor 13; the shafts 45–46 of the two remaining rotors 13 being driven from said shaft 44 by an endless drive 47.

Such shaft 44 also imparts, through an endless drive 48, rotation to the shafts 49–50 of the holding rolls 30–31. In turn, the shaft 49 operates the shafts 51–52 of the holding rolls 26–27 by means of an endless drive 53.

As shown, certain of the identified endless drives include guide or direction-changing rotary members (such as pulleys or sprockets) as necessary to accomplish proper rotation of related shafts. Also, the drive ratios are such that the roll shafts 41–42 and 38–39 turn at substantially greater speeds than the roll shafts 51–52 and 49–50; this to accomplish detachment of the cucumbers from the vines in the manner previously described.

Other than for the variance in diameter between the holding rolls and picking rolls of each of the sets 24 and 25, the individual cushion rolls employed in the picking unit 11 are of identical construction, as follows:

By reference in particular to FIGS. 5 and 6, each cushion roll comprises an elongated, tubular, metallic drum 54 fitted at each end with a central hub 55 supported in the drum by webs 56; the hub having a taper bore 57 which receives—in keyed relation—the inner and tapered end portion of an outwardly projecting mounting spindle 58. Such spindle is provided with an axial bore through which a draw bolt 59 extends to threaded engagement in a draw nut 60 on the inner end of the hub 55. By tightening the draw bolt 59 the tapered inner end portion of the spindle 58 is forcefully seated in said hub 55.

A cylindrical rubber sleeve 61 is vulcanized on the drum 54 while in radially outwardly spaced relation there is a similar cylindrical rubber sleeve 62; the latter—while heavy-duty and quite stiff—being, nevertheless, yieldable and resilient. Such inner sleeve 61 and outer sleeve 62 are connected together in unitary relation and in a manner to support said outer sleeve 62—while permitting the same to resiliently yield inwardly at any point in its periphery—by a plurality of longitudinally spaced, generally radial, rubber discs 63 integral with both of said sleeves, and ported as shown.

While extending generally radial, the discs 63, each annular in form, are, as shown, all cupped—in the same axial direction and to the same extent—between their peripheries. This allows the outer sleeve 62 to yield inwardly at any point without obstruction from the discs 63; the latter because of their cup form yieldably but resiliently temporarily reducing in diameter at such point.

The outer sleeve 62 is formed with a rough tread 64 to enhance the frictional gripping action of the roll.

As so constructed, the cushion rolls are effective—when in use in the picking unit 11—to yield and accommodate the cucumbers which pass in engagement with such rolls and are detached in the manner described.

While especially designed for harvesting cucumbers, and so described herein, a harvester embodying the present invention may be adapted for use with other crops.

From the foregoing description, it will be readily seen that there has been produced such a harvester as substantially fulfills the objects of the invention as set forth herein.

While this specification sets forth in detail the present and preferred construction of the harvester, still in practice such deviations from such detail may be resorted to as do not form a departure from the spirit of the invention.

We claim:
1. A power-actuated, cucumber harvester comprising, on a mobile frame adapted to move along a crop row having cucumber bearing vines growing thereon, a cutter to sever the vines from the crop row as the harvester advances, a picking unit, a conveyor to feed the severed vines to the picking unit, the latter being operative to detach the cucumbers from the vines, the detached cucumbers gravitating from the picking unit, means in part below the picking unit to accumulate the detached cucumbers and convey the same to a predetermined discharge point, and means beyond the picking unit to receive the vines and convey the same to another discharge point; the picking unit including an assembly of driven, cooperating cushion rolls and through which assembly the vines pass, certain of said rolls gripping and feeding the vines at constant speed and in a manner to prevent subsequent acceleration thereof, and other and faster of said rolls beyond said certain rolls simultaneously engaging and feeding the vines in slippage relation while gripping and accelerating the cucumbers whereby to detach the same from said vines.

2. A cucumber harvester, as in claim 1, in which said certain rolls comprise a pair of peripherally cooperating holding rolls, and said other rolls comprise a pair of peripherally cooperating picking rolls disposed in closely adjacent relation to but beyond the holding rolls; all such rolls being in parallel relation, and each being cushion-faced.

3. A picking unit for a power-actuated, cucumber harvester and to which unit cucumber-bearing vines, previously severed from the ground, are fed; said picking unit, through which the vines progress in a longitudinal path, embodying a cushion roll assembly comprised of a first pair of transverse, peripherally cooperating, cushion-faced rolls which are set and driven to grip and feed the vines at a substantially constant speed and in a manner to prevent acceleration of leading portions thereof, and a second pair of transverse, peripherally cooperating, cushion-faced rolls disposed beyond said first pair of rolls and driven in the same direction but substantially faster than the latter; said second pair of rolls being set and driven to engage and feed the leading portions of the vines in slippage relation while gripping and accelerating the cucumbers whereby to detach the same from the vines and whose trailing portions remain gripped by said first pair of rolls.

4. A picking unit, as in claim 3, in which the rolls of each pair are peripherally rough-surfaced.

5. A picking unit, as in claim 3, including a third and fourth pair of transverse, peripherally cooperating, cushion-faced rolls disposed closely adjacent but beyond said first and second pairs of rolls; said third and fourth pairs of rolls being disposed in relative positions corresponding to such first and second pairs of rolls, and set and driven to act upon the vines in like manner.

6. A picking unit, as in claim 5, in which the vines travel through all four pairs of said rolls in a substantially continuous progression.

7. A picking unit for a power-actuated, cucumber harvester and to which unit cucumber-bearing vines, previously severed from the ground, are fed; said picking unit, through which the vines move in a substantially continuous progression, embodying first instrumentalities acting on the vines at one point to feed the same at a substantially constant speed and in a manner to prevent acceleration thereof at a subsequent point of progression, and other instrumentalities acting on the vines at said subsequent point to feed the vines at a speed limited by said first instrumentalities while accelerating the cucumbers whereby to detach the same from such vines.

8. A picking unit for a power-actuated, produce harvester and to which unit produce-bearing vines, previously severed from the ground, are fed; said picking unit, through which the vines move in lengthwise progression, embodying first means acting on the vines and produce at one point in their progression to hold one thereof against acceleration, and second means acting on the vines and produce at another point in their progression to accelerate the other thereof, whereby with one held against acceleration and the other accelerated at said respective points detachment of the produce from the vines is effected; said first and second means each comprising a pair of transverse, peripherally cooperating, cushion-faced rolls between which the vines pass; such pairs of rolls being driven at different peripheral speeds in a direction to progress the vines, the rolls of one pair being of substantially lesser diameter than the rolls of the other pair, and said pair of lesser diameter rolls being positioned immediately adjacent the other pair whereby to reduce the span between the points at which the pairs of rolls engage the vines.

9. A picking unit for a power-actuated, produce harvester and to which unit produce-bearing vines, previously severed from the ground, are fed; said picking unit, through which the vines move in lengthwise progression, embodying first means acting on the vines and produce at one point in their progression to hold one thereof against acceleration, and second means acting on the vines and produce at another point in their progression to accelerate the other thereof, whereby with one held against acceleration and the other accelerated at said respective points detachment of the produce from the vines is effected; each of such means comprising a pair of driven, cushion-faced rolls mounted in peripherally cooperating relation and between which the vines pass in the progression thereof; said pairs of rolls being disposed in closely adjacent relation in the direction of such vine progression, with the rolls of one pair of substantially lesser diameter than the other pair.

References Cited

UNITED STATES PATENTS

| | | | |
|---|---|---|---|
| 2,829,484 | 4/1958 | Gilbert | 56—327 |
| 2,841,947 | 7/1958 | Grew | 56—327 |
| 3,294,094 | 12/1966 | Dreyer | 56—327 |
| 3,347,031 | 10/1967 | DeLong et al. | 56—327 |
| 3,387,611 | 6/1968 | Looker | 56—327 X |

ANTONIO F. GUIDA, Primary Examiner

U.S. Cl. X.R.

171—28